(12) United States Patent
Drozdenko et al.

(10) Patent No.: US 10,087,948 B2
(45) Date of Patent: Oct. 2, 2018

(54) FAN BLADE AND METHOD OF COVERING A FAN BLADE ROOT PORTION

(71) Applicant: UNITED TECHNOLOGIES CORPORATION, Farmington, CT (US)

(72) Inventors: Lee Drozdenko, Bristol, CT (US); James O. Hansen, Glastonbury, CT (US); Christopher J. Hertel, Wethersfield, CT (US); Steven T. Holland, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 554 days.

(21) Appl. No.: 14/673,287

(22) Filed: Mar. 30, 2015

(65) Prior Publication Data

US 2016/0290356 A1    Oct. 6, 2016

(51) Int. Cl.

| | |
|---|---|
| *F01D 5/30* | (2006.01) |
| *F04D 29/34* | (2006.01) |
| *B05D 1/02* | (2006.01) |
| *B05D 1/18* | (2006.01) |
| *B29C 65/66* | (2006.01) |
| *F04D 19/00* | (2006.01) |
| *F04D 29/02* | (2006.01) |

(Continued)

(52) U.S. Cl.
CPC .............. *F04D 29/34* (2013.01); *B05D 1/02* (2013.01); *B05D 1/18* (2013.01); *B29C 65/66* (2013.01); *F01D 5/3092* (2013.01); *F04D 19/002* (2013.01); *F04D 29/023* (2013.01); *F04D 29/388* (2013.01); *B29K 2063/00* (2013.01); *B29K 2105/06* (2013.01); *B29L 2031/082* (2013.01); *F05D 2220/36* (2013.01)

(58) Field of Classification Search
CPC ..................................................... F01D 5/3092
See application file for complete search history.

(56) References Cited

U.S. PATENT DOCUMENTS 5,573,377 A * 11/1996 Bond ....................... F01D 5/147
                                                                    416/219 R
6,431,835 B1 * 8/2002 Kolodziej ................. F01D 5/28
                                                                    416/219 R (Continued)

FOREIGN PATENT DOCUMENTS

| EP | 0495586 A1 | 7/1992 |
|---|---|---|
| WO | 9641068 A1 | 12/1996 |

OTHER PUBLICATIONS

European Search Report for Application No. EP 16 16 2389.

*Primary Examiner* — Justin Seabe
*Assistant Examiner* — Juan G Flores
(74) *Attorney, Agent, or Firm* — Cantor Colburn LLP

(57) ABSTRACT

A fan blade and method of covering a fan blade root portion for a gas turbine engine are disclosed. The fan blade includes an airfoil having a leading edge end and a trailing edge end, a root portion having a first side surface extending from the leading edge end to the trailing edge end and a second side surface at an opposite side of the first side surface and extending from the leading edge end to the trailing edge end, and a covering disposed against the first side surface and the second side surface, wherein the covering is positioned against the root portion as a single member.

13 Claims, 5 Drawing Sheets

(51) Int. Cl.
*F04D 29/38* (2006.01)
*B29K 63/00* (2006.01)
*B29K 105/06* (2006.01)
*B29L 31/08* (2006.01)

(56) References Cited

U.S. PATENT DOCUMENTS

| | | | | |
|---|---|---|---|---|
| 6,652,369 B2* | 11/2003 | Jones | ................... | B23Q 3/063 |
| | | | | 269/238 |
| 6,751,863 B2* | 6/2004 | Tefft | ..................... | C23C 4/00 |
| | | | | 219/121.47 |
| 2009/0060745 A1* | 3/2009 | Douguet | ............... | F01D 5/3007 |
| | | | | 416/219 R |
| 2010/0226777 A1 | 9/2010 | Forgue et al. | | |
| 2012/0082559 A1* | 4/2012 | Guglielmin | ........... | F04D 29/388 |
| | | | | 416/241 R |
| 2012/0082783 A1 | 4/2012 | Barnett et al. | | |

* cited by examiner

FAN BLADE AND METHOD OF COVERING A FAN BLADE ROOT PORTION

TECHNICAL FIELD OF THE DISCLOSED EMBODIMENTS

The present disclosure is generally related to gas turbine engines, in particular to fan blades and methods of covering a fan blade root portion for gas turbine engines.

BACKGROUND OF THE DISCLOSED EMBODIMENTS

A gas turbine engine includes a fan having an array of fan blades coupled to a central fan hub to generate bypass and core airflow. Each fan blade includes a root portion or dovetail at a radially inner end of the fan blade that is configured to be inserted into a corresponding slot of the fan hub. During operation of the gas turbine engine, the fan blade and fan hub may experience corrosion, wear, and damage at the interface of the root portion and the fan hub slot due to multi-directional stress, vibration, and occasional contact with foreign objects. Repair, maintenance, and assembly operations involving fan blade removal or installation may further wear the surfaces of the fan blades and/or the fan hub.

A need exists in the art for a fan blade structure and method that provides wear and corrosion resistance, dampening, resilience, compliance, or energy absorption in a cost-effective manner at the interface of the fan blade and fan hub.

SUMMARY OF THE DISCLOSED EMBODIMENTS

In an embodiment, a fan blade for a gas turbine engine is disclosed, the fan blade comprises an airfoil having a leading edge end and a trailing edge end, a root portion disposed radially inward from the airfoil and having a first side surface extending from the leading edge end to the trailing edge end and a second side surface opposite the first side surface and extending from the leading edge end to the trailing edge end, and a single continuous covering disposed against the first side surface and the second side surface.

In a further embodiment of the above, the root portion further comprises a leading edge end surface and a trailing edge end surface, the covering being further disposed at least partially against the leading edge end surface and the trailing edge end surface. In a further embodiment of any of the above, the root portion further comprises a lower surface extending between the first side surface and the second side surface, the covering being further disposed against the lower surface. In a further embodiment of any of the above, the fan blade further comprises a neck portion adjacent the root portion, wherein covering is further positioned against the neck portion. In a further embodiment of any of the above, the root portion is dipped into a coating material to form the covering. In a further embodiment of any of the above, the root portion is sprayed with a coating material to form the covering. In a further embodiment of any of the above, the covering is shrink-wrapped around the root portion. In a further embodiment of any of the above, the covering comprises a polymer coating. In a further embodiment of any of the above, the covering comprises a reinforced epoxy. In a further embodiment of any of the above, the covering comprises multiple layers.

In another embodiment, a method of covering a fan blade root portion for a gas turbine engine is disclosed comprising providing a fan blade comprising an airfoil having a leading edge end and a trailing edge end, and a root portion having a first side surface extending from the leading edge end to the trailing edge end and a second side surface at an opposite side of the first side surface and extending from the leading edge end to the trailing edge end, and applying a single continuous covering to the root portion such that the covering is disposed against the first side surface and the second side surface.

In a further embodiment of any of the above, the root portion further comprises a leading edge end surface and a trailing edge end surface and applying the covering includes applying the covering at least partially against the leading edge end surface and the trailing edge end surface. In a further embodiment of any of the above, the root portion further comprises a lower surface extending between the first side surface and the second side surface and applying the covering includes applying the covering against the lower surface. In a further embodiment of any of the above, the fan blade further comprises a neck portion adjacent the root portion and applying the covering includes applying the covering against the neck portion. In a further embodiment of any of the above, applying the covering comprises dipping the root portion into a coating material to form the covering. In a further embodiment of any of the above, applying the covering comprises spraying the root portion with a coating material to form the covering. In a further embodiment of any of the above, applying the covering comprises shrink-wrapping the root portion. In a further embodiment of any of the above, the method further comprises applying an exterior coating to the airfoil and the root portion, wherein the covering is positioned between the root portion and the exterior coating. In a further embodiment of any of the above, the method further comprises providing a fan hub with a fan hub slot and inserting the root portion of the fan blade into the fan hub slot. In a further embodiment of any of the above, the method further comprises removing the root portion of the fan blade from the fan hub slot.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
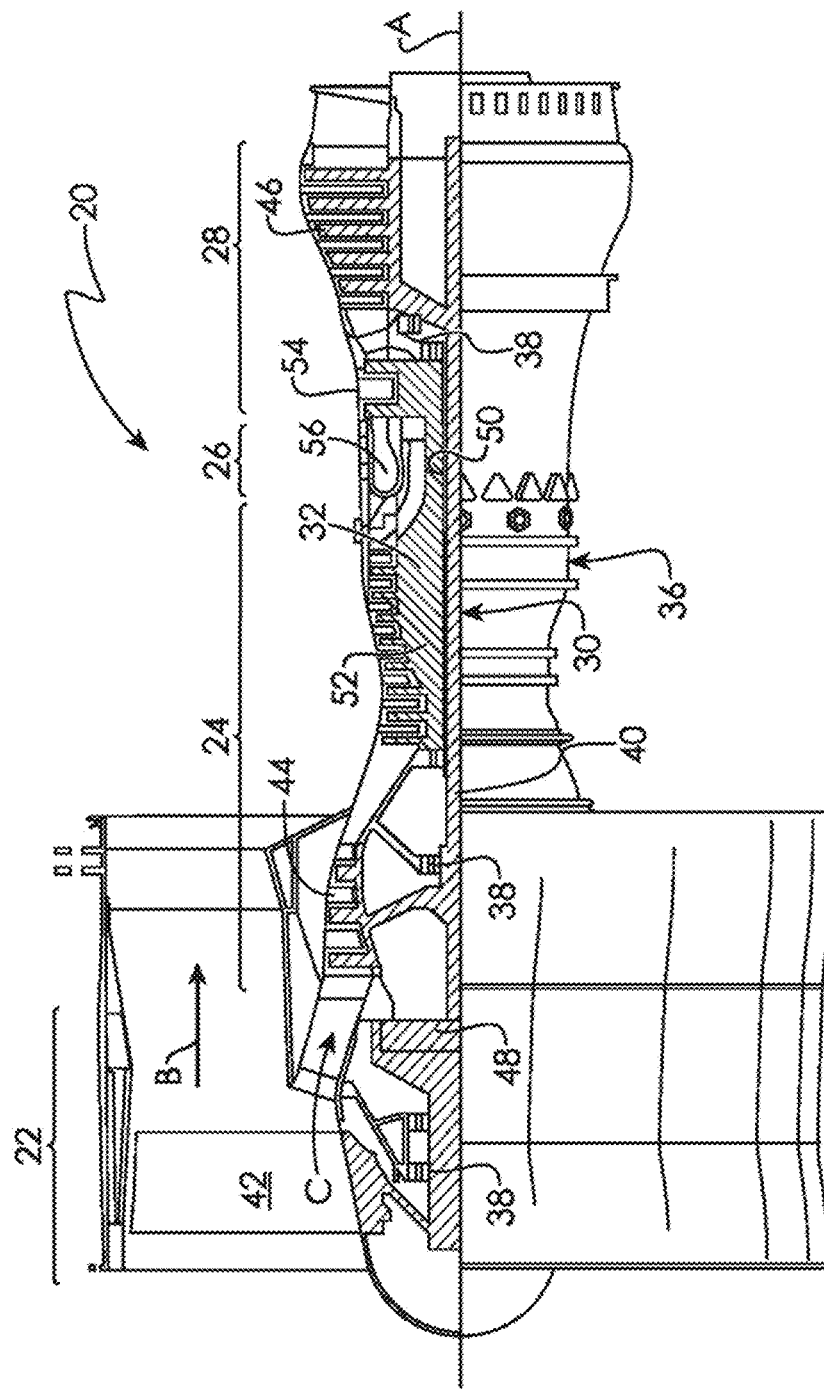
FIG. 1 is a sectional view of one example of a gas turbine engine in which the presently disclosed embodiments may be used.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
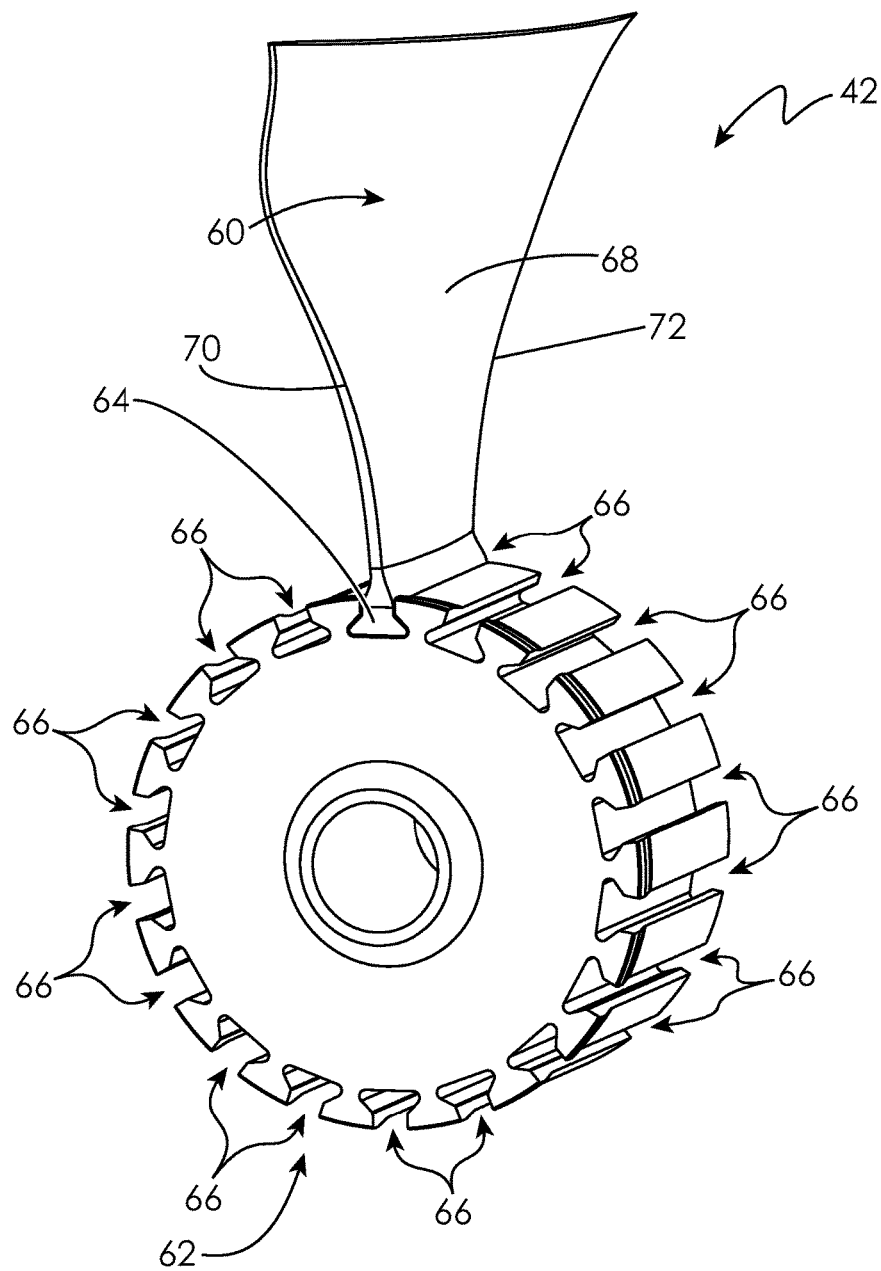
FIG. 2 is a perspective view of a fan blade and a fan hub used in a gas turbine engine in one embodiment.

Referring now to FIG. 2, a fan blade 60 and a fan hub 62 according to one or more embodiments of the present disclosure are shown. FIG. 2 illustrates a root portion 64, also referred to as a dovetail, of the fan blade 60 inserted into a fan hub slot 66 of the fan hub 62. The fan blade 60 includes an airfoil 68 having a leading edge end 70 and a trailing edge end 72. The airfoil 68 forms the largest portion of the fan blade 60 and is located radially outside of the root portion 64. The fan blade 60 and fan hub 62 of one embodiment are made from an aluminum material.

Figure 3:
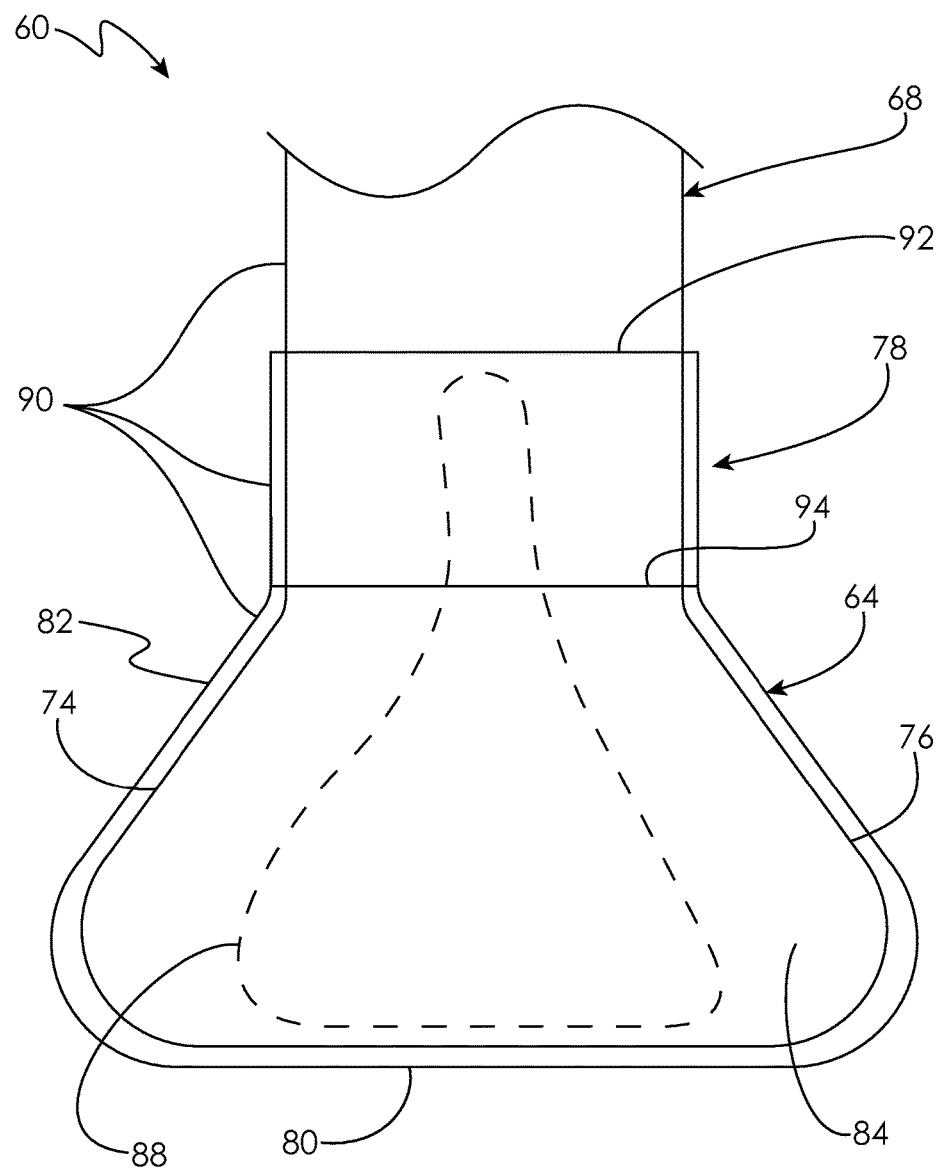
FIG. 3 is an enlarged front elevation view of a fan blade used in a gas turbine engine in one embodiment.
Figure 4:
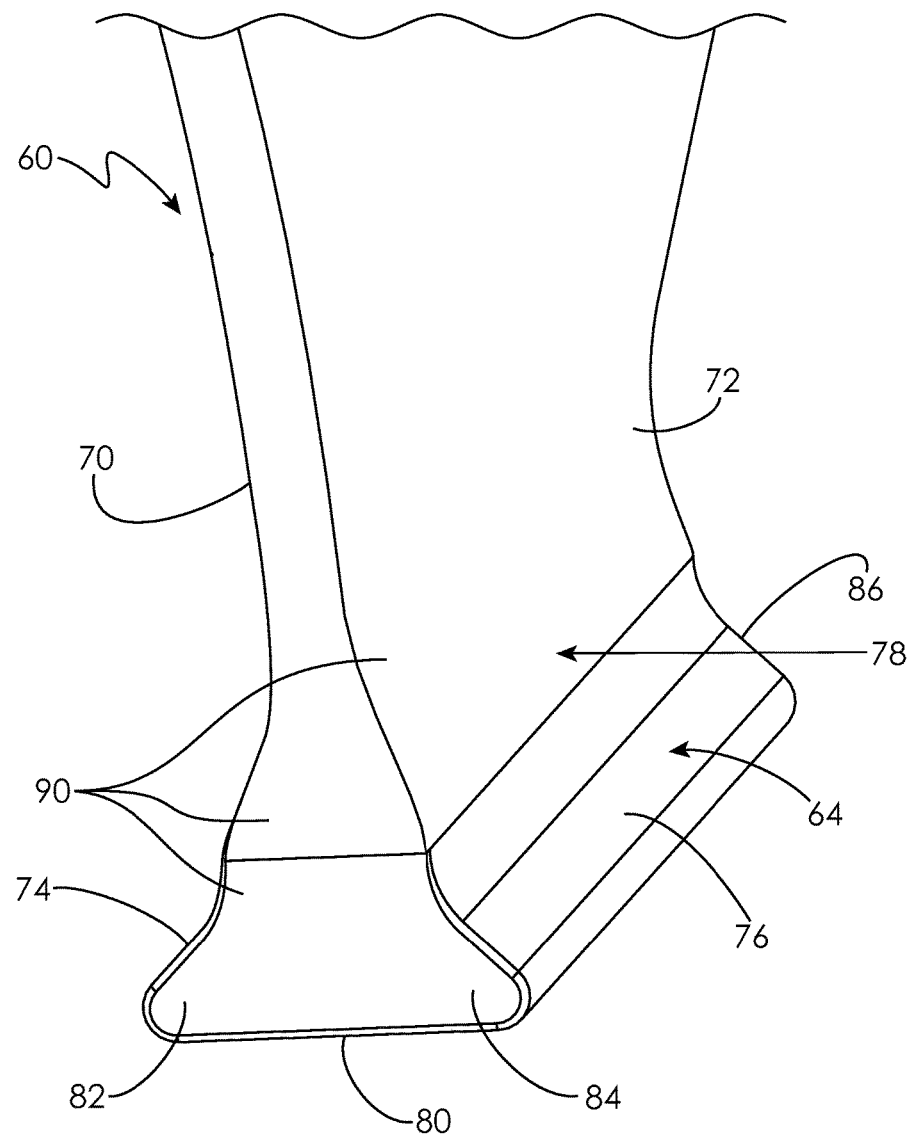
FIG. 4 is a perspective view of a fan blade used in a gas turbine engine in one embodiment.

Referring now to FIGS. 3 and 4, the root portion 64 of the fan blade 60 includes a first side surface 74 extending from the leading edge end 70 to the trailing edge end 72. The root portion 64 further includes a second side surface 76 opposite the first side surface 74 extending from the leading edge end 70 to the trailing edge end 72. A neck portion 78 is positioned adjacent the root portion 64 between the root portion 64 and the airfoil 68. The root portion 64 further includes a lower surface 80 extending between the first side surface 74 and the second side surface 76, as shown in FIG. 3. A covering 82 is disposed at least against the first side surface 74 and the second side surface 76. The covering 82 is positioned against the root portion 64 as a single continuous member (although it may comprise more than one layer) as illustrated in FIGS. 3 and 4. In one or more embodiments, the covering 82 is a single continuous material (although it may comprise more than one layer) wrapped or formed around the fan blade 60. The covering 82 of the present disclosure may include such properties as wear resistance, corrosion resistance, dampening, resilience, compliance, or energy absorption, as will be explained in further detail below.

In accordance with one or more embodiments of the present disclosure, the root portion 64 includes a leading edge end surface 84 and a trailing edge end surface 86. In one embodiment, the leading edge end surface 84 and the trailing edge end surface 86 are axially aligned with the leading edge end 70 and the trailing edge end 72 of the fan blade 60 and are substantially perpendicular to the lower surface 80. The covering 82 of an embodiment is further disposed at least partially against the leading edge end surface 84 and the trailing edge end surface 86. The root portion 64 of the embodiment shown in FIG. 3 features the covering 82 being further disposed against the lower surface 80. The covering 82 of an embodiment is further positioned against the neck portion 78. The covering 82 is applied to the fan blade 60 in an embodiment up to a sufficiently high or radially outer location, as illustrated by line 92 in FIG. 3, for protection of the fan blade 60 during installation into or removal from the fan hub 62 without being positioned in the flow path of working air propelled by the fan blade 60 during engine operation. One embodiment of the fan blade 60 includes the covering 82 being only applied to the root portion 64 up to the line 94. In one embodiment, the covering 82 fully encapsulates the root portion 64, thereby enhancing corrosion resistance.

The covering 82 of one or more embodiments consists of a polymeric material. The covering 82 of one embodiment is a reinforced epoxy. One or more embodiments of the covering 82 include a fiber-filled epoxy and/or an epoxy reinforced with particulate or microspheres, including PTFE spheres. Further embodiments of the covering 82 include aluminum oxide for wear resistance in a polyimide binder. One of ordinary skill in the art will recognize various materials of varying form and composition, individually or in combination, having properties such as wear resistance, corrosion resistance, dampening, resilience, compliance, or energy absorption suitable for use with a gas turbine fan blade, and such materials or combination of materials form part of the present disclosure. Further, the covering 82 of one or more embodiments includes multiple layers performing one or more of the desired functions of wear resistance, corrosion resistance, dampening, resilience, compliance, and energy absorption. In one embodiment, a first layer of the covering 82 includes a corrosion resistant material and a second layer includes a wear resistant layer.

In an embodiment, the root portion 64 is dipped into a coating material to form the covering 82. The coating material includes any covering material described above. In one embodiment, tabs (not shown) at the leading edge end surface 84 and the trailing edge end surface 86 are ground down to form tab surfaces 88 of the root portion 64. As shown in FIG. 3, the tab surfaces 88 of an embodiment are masked prior to the covering application to prevent the covering 82 from being applied to the tab surfaces 88. In another embodiment, one or more tab surfaces 88, either ground down or unground, allow sufficient bonding such that the coating material adheres to the one or more tab surfaces 88 to form part of the covering 82. Following dipping, the covering 82 solidifies against the root portion 64 as a single member as shown in FIGS. 3 and 4.

The root portion 64 of an embodiment is sprayed with a coating material to form the covering 82. The coating material includes any covering material described above. In one embodiment, tabs (not shown) at the leading edge end surface 84 and the trailing edge end surface 86 are ground down to form tab surfaces 88 of the root portion 64. In another embodiment, one or more tab surfaces 88, either ground down or unground, allow sufficient bonding such that the coating material adheres to the one or more tab surfaces 88 to form part of the covering 82. As shown in FIG. 3, the tab surfaces 88 of an embodiment and any exposed airfoil 68 or neck portions 78 not targeted for spraying are masked prior to the covering application to prevent the covering 82 from being applied to the tab surfaces 88, airfoil 68, or designated neck portions 78. Following spraying, the covering 82 solidifies against the root portion 64 as a single member as shown in FIGS. 3 and 4.

In a further embodiment, the covering 82 is shrink-wrapped around the root portion 64. The covering 82 of an embodiment is a single piece of material capable of shrinking upon heat exposure. The covering 82 is wrapped around the root portion 64 and any designated neck portion 78 so as to form a single encapsulating shell around the root portion 64. One of ordinary skill will recognize heat-shrinking or shrink-wrapping materials having properties such as wear resistance, corrosion resistance, dampening, resilience, compliance, or energy absorption suitable for use with a gas turbine fan blade, and such materials form part of the present disclosure. Further, embodiments of the present disclosure include various other covering application materials and methods recognized by one of ordinary skill in the art including the combination of one or more dipping, spraying, shrink-wrapping, or other methods to apply the covering 82.

The fan blade 60 of an embodiment includes an exterior coating 90 that is applied to the airfoil 68, neck portion 78, and root portion 64 for further protection against corrosion and/or wear. The exterior coating 90 covers or encapsulates the covering 82 to further protect the root portion 64 and/or neck portion 78 during assembly or maintenance of the fan 42 or during engine operation.

Figure 5:
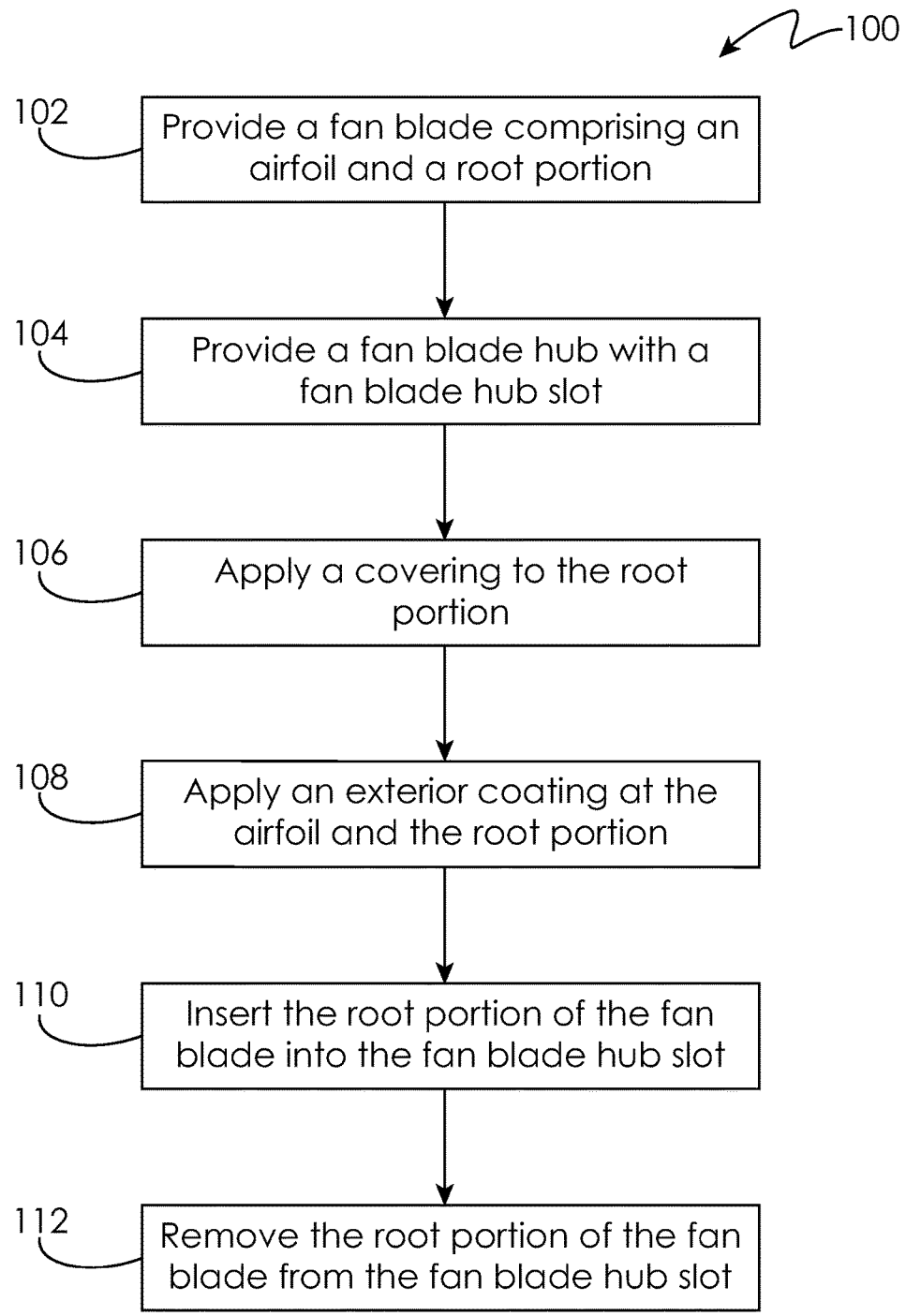
FIG. 5 is a schematic flow diagram of a method of covering a fan blade root portion for a gas turbine engine in one embodiment.

Referring now to FIG. 5, the present disclosure includes a method 100 of covering the fan blade root portion 64. The method 100 includes providing, at step 102, the fan blade 60 including an airfoil 68 having the leading edge end 70 and the trailing edge end 72 and the root portion 64 as described above. The method 100 further includes applying, at step 104, the covering 82 to the root portion 64 such that the covering 82 is disposed against the first side surface 74 and the second side surface 76 as a single member. The method 100 of an embodiment further includes applying the covering 82 at least partially against the leading edge end surface 84 and the trailing edge end surface 86. The method 100 of an embodiment further includes applying the covering 82 against the lower surface 80. In an embodiment, the method 100 further includes applying the covering 82 against the neck portion 78.

The method 100 of an embodiment includes optionally applying, at step 106, the exterior coating 90 to the fan blade 60 following the application of the covering 82. The exterior coating 90 is applied at the airfoil 68, neck 78, and root portion 64 of the fan blade 60. The covering 82 is positioned between the root portion 64 and the exterior coating 90. The exterior coating 90 provides an additional layer of wear and corrosion resistance for the fan blade 60.

With reference to FIG. 2, the method 100 of an embodiment includes providing, at step 108, the fan hub 62 with a fan hub slot 66 and inserting, at step 110, the root portion 64 of the fan blade 60 into the fan hub slot 66. The method 100 of an embodiment includes removing, at step 112, the root portion 64 of the fan blade 60 from the fan hub slot 66, such as during maintenance, repair, or disassembly of the fan 42.

As described above, the method 100 of one or more embodiments of the present disclosure includes dipping the root portion 64 into, or spraying the root portion 64 with, a coating material or shrink-wrapping the root portion 64 to form the covering 82. The method of the present disclosure includes the utilization of materials of varying form and composition, individually or in combination, having properties such as wear resistance, corrosion resistance, dampening, resilience, compliance, or energy absorption suitable for use with a gas turbine fan blade.

Referring again to FIG. 2, during assembly and maintenance of the gas turbine engine 20, fan blades 60 are inserted into and/or removed from the fan hub 62. The root portion 64 of each installed fan blade 60 contacts a corresponding fan hub slot 66. Such contact may result in wear and possible structural damage to the root portion 64 of each fan blade 60 or the fan hub 62. Further, operation of the gas turbine engine 20 causes vibrations and stress at the root portion 64 of each fan blade 60 and the fan hub 62, thereby contributing to the potential wear and damage. The fan blade covering 82 and method 100 of the present disclosure enhance fan blade performance by resisting wear and corrosion of either the fan blade root or neck portions 64, 78 or the fan hub 62 with a covering 82 that protects areas vulnerable to wear, corrosion, or damage. The covering 82 is applied through a process that is cost-effective with respect to both material and labor. Further, the fan blade covering 82 and method 100 provides dampening of vibrations that occur during operation of the gas turbine engine 20, thereby further preventing damage and wear. The fan blade covering 82 and method 100 provide a resilient and compliant interface between the fan blade 60 and fan hub 62 to prevent damage and provide proper fitment during engine assembly, maintenance, and operation. The fan blade covering 82 and method 100 also provide energy absorption to prevent failure of any portion of the fan blade 60 or fan hub 62 after interference with a foreign object, such as a bird strike event.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A fan blade for a gas turbine engine, the fan blade comprising:
    an airfoil having a leading edge end and a trailing edge end;
    a root portion disposed radially inward from the airfoil and having a first side surface extending from the leading edge end to the trailing edge end and a second side surface opposite the first side surface and extending from the leading edge end to the trailing edge end, wherein the root portion further comprises a leading edge end surface and a trailing edge end surface and a lower surface extending between the first side surface and the second side surface; and
    a single continuous covering disposed against the root portion, wherein the covering fully encapsulates the root portion and wherein the root portion is sprayed with a coating material to form the covering, wherein the covering comprises a polymer coating.

2. The fan blade of claim 1, wherein the root portion further comprises tab surfaces disposed on either or both of the leading edge end surface and the trailing edge end surface.

3. The fan blade of claim 2, wherein the tab surfaces of the root portion are either ground down or unground prior to the application of the covering and/or wherein the tab surfaces are masked prior to the application of the covering.

4. The fan blade of claim 1, further comprising a neck portion adjacent the root portion, wherein covering is further positioned against the neck portion.

5. The fan blade of claim 1, wherein the covering comprises multiple layers.

6. A fan blade for a gas turbine engine, the fan blade comprising:
    an airfoil having a leading edge end and a trailing edge end;
    a root portion disposed radially inward from the airfoil and having a first side surface extending from the leading edge end to the trailing edge end and a second side surface opposite the first side surface and extending from the leading edge end to the trailing edge end, wherein the root portion further comprises a leading edge end surface and a trailing edge end surface and a lower surface extending between the first side surface and the second side surface; and
    a single continuous covering disposed against the root portion, wherein the covering fully encapsulates the root portion and wherein the root portion is sprayed with a coating material to form the covering, wherein the covering comprises a reinforced epoxy.

7. A method of covering a fan blade root portion for a gas turbine engine, comprising:
    providing a fan blade comprising:
        an airfoil having a leading edge end and a trailing edge end; and
        a root portion having a first side surface extending from the leading edge end to the trailing edge end and a second side surface at an opposite side of the first side surface and extending from the leading edge end to the trailing edge end, wherein the root portion further comprises a leading edge end surface and a trailing edge end surface and a lower surface extending between the first side surface and the second side surface; and
    applying a single continuous covering to the root portion such that the covering fully encapsulates the root portion, wherein applying the covering comprises spraying the root portion with a polymer coating material or a reinforced epoxy to form the covering.

8. The method of claim 7, wherein the root portion further comprises tab surfaces disposed on either or both of the leading edge end surface and the trailing edge end surface.

9. The method of claim 8, wherein the tab surfaces of the root portion are either ground down or unground prior to the application of the covering and/or wherein the tab surfaces are masked prior to the application of the covering.

10. The method of claim 7, wherein the fan blade further comprises a neck portion adjacent the root portion and applying the covering includes applying the covering against the neck portion.

11. The method of claim 7, further comprising applying an exterior coating to the airfoil and the root portion, wherein the covering is positioned between the root portion and the exterior coating.

12. The method of claim 7, further comprising:
    providing a fan hub with a fan hub slot; and
    inserting the root portion of the fan blade into the fan hub slot.

13. The method of claim 12, further comprising removing the root portion of the fan blade from the fan hub slot.

* * * * *